(12) United States Patent
Muthusamy et al.

(10) Patent No.: US 9,796,901 B2
(45) Date of Patent: *Oct. 24, 2017

(54) ALKYL POLYGLYCOSIDE DERIVATIVE AS BIODEGRADABLE SPACER SURFACTANT

(71) Applicant: Halliburton Energy Services, Inc., Houston, TX (US)

(72) Inventors: Ramesh Muthusamy, Pune (IN); Abhimanyu Pramod Deshpande, Pune (IN); Rahul Chamdrakant Patil, Pune (IN); Sandip Prabhakar Patil, Pune (IN)

(73) Assignee: Halliburton Energy Services, Inc., Houston, TX (US)

( * ) Notice: Subject to any disclaimer, the term of this patent is extended or adjusted under 35 U.S.C. 154(b) by 109 days.

This patent is subject to a terminal disclaimer.

(21) Appl. No.: 14/336,383

(22) Filed: Jul. 21, 2014

(65) Prior Publication Data

US 2015/0080272 A1   Mar. 19, 2015

Related U.S. Application Data

(62) Division of application No. 13/786,227, filed on Mar. 5, 2013, now Pat. No. 9,012,379.

(51) Int. Cl.
| | |
|---|---|
| *C09K 8/40* | (2006.01) |
| *C09K 8/32* | (2006.01) |
| *C09K 8/60* | (2006.01) |
| *C09K 8/588* | (2006.01) |

(52) U.S. Cl.
CPC ............... *C09K 8/32* (2013.01); *C09K 8/40* (2013.01); *C09K 8/588* (2013.01); *C09K 8/601* (2013.01)

(58) Field of Classification Search
CPC . C09K 8/588; C09K 8/40; C09K 8/54; C09K 8/584; C09K 2208/32; C09K 8/035; C09K 8/32; C09K 8/524; C09K 8/58; C09K 8/601; C09K 15/30; C09K 19/3809; C09K 19/544; C09K 5/08; C09K 5/14; C09K 8/467; C09K 8/424; C09K 8/46; C09K 8/48; C09K 8/52; C09K 8/42; C09K 8/50; C09K 8/74; C09K 2208/08; C09K 2208/10; C09K 8/56; C09K 8/64; C09K 8/685; C09K 8/805; C09K 8/82; C09K 8/887; C09K 2208/12; C09K 2208/14; C09K 2208/18; C09K 2208/28; C09K 2208/34; C09K 8/03; C09K 8/06; C09K 8/12

See application file for complete search history.

(56) References Cited

U.S. PATENT DOCUMENTS

| | | | |
|---|---|---|---|
| 5,366,654 A | 11/1994 | Van Den Brom et al. | |
| 5,458,197 A * | 10/1995 | Chan | C09K 8/52 |
| | | | 166/304 |
| 5,756,438 A * | 5/1998 | Rau | A61K 8/0229 |
| | | | 510/151 |
| 6,672,388 B2 | 1/2004 | McGregor et al. | |
| 2008/0011486 A1 | 1/2008 | Zhang et al. | |
| 2008/0274918 A1 | 11/2008 | Quintero et al. | |
| 2009/0194278 A1 | 8/2009 | De Francesco | |
| 2010/0035999 A1 * | 2/2010 | Pereira | A61K 8/45 |
| | | | 514/772 |
| 2010/0263863 A1 * | 10/2010 | Quintero | C09K 8/40 |
| | | | 166/267 |
| 2012/0157365 A1 * | 6/2012 | Fevola | A61K 8/368 |
| | | | 510/127 |

FOREIGN PATENT DOCUMENTS

| | | | |
|---|---|---|---|
| WO | 2012170028 A1 | 12/2012 | |
| WO | WO2012/170028 | * 12/2012 | |

OTHER PUBLICATIONS

International Preliminary Report on Patentability issued in related PCT Application No. PCT/US2014/011802, dated Sep. 17, 2015 (9 pages).
Kris Ravi, Seth Moore, "Cement Slurry Design to Prevent Destabilization of Hydrates in Deepwater Environment," SPE 113631, 2008 Indian Oil and Gas Technical Conference and Exhibition, Mumbai, India, Mar. 4-6, 2008, 8 pages.
B.R. Reddy, "Novel Low Heat-of-Hydration Cement Compositions for Cementing Gas Hydrates Zones," SPE 114927, CIPC/SPE Gas Technology Symposium 2008 Joint Conference, Calgary, Alberta, Canada, Jun. 16-19, 2008, 8 pages.
"Heat of Hydration Testing," Halliburton, Cementing-Specialized Testing, Procedure No. WM-GL-HES-QM-434.140, Global Laboratory Best Practices, vol. 2, Nov. 2010, pp. 159-164.
"7 Preparation of Slurry for Fee Fluid, Compressive Strength and Thickening Time Tests," API Specification 10A/ISO 10426-1:2000, American Petroleum Institute, pp. 10-32.
Sairam PKS, Rahul Patil, Sandip Patil, "Design Considerations for Isolating Gas-Hydrate-Bearing Zones in Deepwater Environments," SPE 157280, SPE International Production and Operations Conference and Exhibition, Doha Qatar, May 14-16, 2012, 22 pages.
International Search Report and Written Opinion dated May 1, 2014 for Application No. PCT/US2014/011802.

* cited by examiner

*Primary Examiner* — Kumar R Bhushan
(74) *Attorney, Agent, or Firm* — Craig W. Roddy; Baker Botts L.L.P.

(57) ABSTRACT

A spacer fluid comprising: (a) water; and (b) an alkyl polyglycoside derivative, wherein the alkyl polyglycoside derivative is selected from the group consisting of sorbitan fatty acids; functionalized sulfonates, functionalized betaines, an inorganic salt of any of the foregoing, and any combination of any of the foregoing. Preferably, the spacer fluid additionally comprises a solid particulate, such as a weighting agent. A method of displacing an oil-based drilling mud from a portion of a well comprising the steps of: (A) forming the spacer fluid; and (B) introducing the spacer fluid into the well.

16 Claims, 1 Drawing Sheet

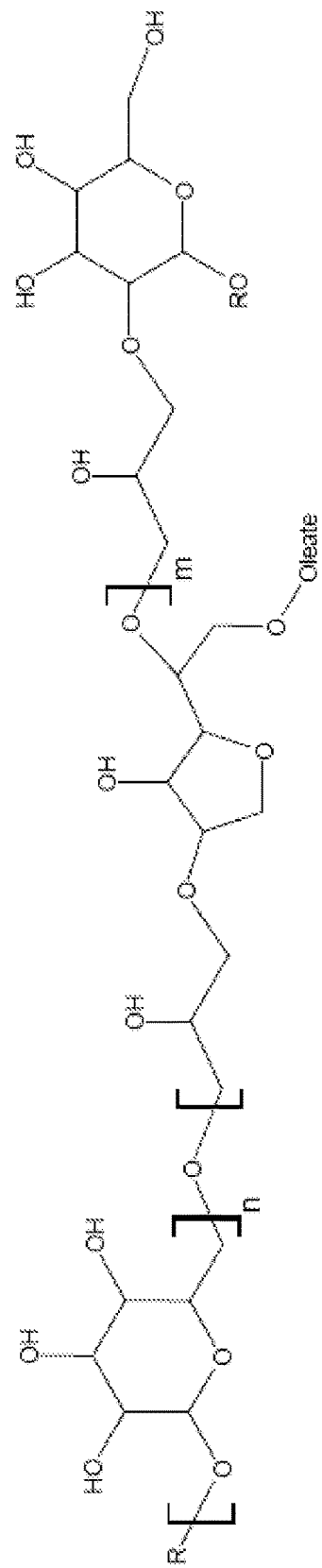

ALKYL POLYGLYCOSIDE DERIVATIVE AS BIODEGRADABLE SPACER SURFACTANT

CROSS-REFERENCE TO RELATED APPLICATIONS

This application is a divisional of U.S. Non-Provisional patent application Ser. No. 13/786,227, filed Mar. 5, 2013, entitled "Alkyl Polyglycoside Derivative as Biodegradable Spacer Surfactant," which is hereby incorporated by reference in its entirety.

TECHNICAL FIELD

The inventions are in the field of producing crude oil or natural gas from subterranean formations. More specifically, the inventions generally relate to spacer fluids and methods of displacing an oil-based drilling mud from a well.

BACKGROUND

Oil & Gas Wells

To produce oil or gas from a reservoir, a well is drilled into a subterranean formation, which may be the reservoir or adjacent to the reservoir. Typically, a wellbore of a well must be drilled hundreds or thousands of feet into the earth to reach a hydrocarbon-bearing formation.

Generally, well services include a wide variety of operations that may be performed in oil, gas, geothermal, or water wells, such as drilling, cementing, completion, and intervention. Well services are designed to facilitate or enhance the production of desirable fluids such as oil or gas from or through a subterranean formation. A well service usually involves introducing a well fluid into a well.

Drilling is the process of drilling the wellbore. After a portion of the wellbore is drilled, sections of steel pipe, referred to as casing, which are slightly smaller in diameter than the borehole, are placed in at least the uppermost portions of the wellbore. The casing provides structural integrity to the newly drilled borehole.

Cementing is a common well operation. For example, hydraulic cement compositions can be used in cementing operations in which a string of pipe, such as casing or liner, is cemented in a wellbore. The cement stabilizes the pipe in the wellbore and prevents undesirable migration of fluids along the annulus between the wellbore and the outside of the casing or liner from one zone along the wellbore to the next. Where the wellbore penetrates into a hydrocarbon-bearing zone of a subterranean formation, the casing can later be perforated to allow fluid communication between the zone and the wellbore. The cemented casing also enables subsequent or remedial separation or isolation of one or more production zones of the wellbore by using downhole tools, such as packers or plugs, or by using other techniques, such as forming sand plugs or placing cement in the perforations. Hydraulic cement compositions can also be utilized in intervention operations, such as in plugging highly permeable zones, or fractures in zones, that may be producing too much water, plugging cracks or holes in pipe strings, and the like.

Cementing and Hydraulic Cement Compositions

In a cementing operation, a hydraulic cement, water, and any other components are mixed to form a hydraulic cement composition in fluid form. The hydraulic cement composition is pumped as a fluid (typically in the form of suspension or slurry) into a desired location in the wellbore. For example, in cementing a casing or liner, the hydraulic cement composition is pumped into the annular space between the exterior surfaces of a pipe string and the borehole (that is, the wall of the wellbore). The hydraulic cement composition should be a fluid for a sufficient time before setting to allow for pumping the composition into the wellbore and for placement in a desired downhole location in the well. The cement composition is allowed time to set in the annular space, thereby forming an annular sheath of hardened, substantially impermeable cement. The hardened cement supports and positions the pipe string in the wellbore and fills the annular space between the exterior surfaces of the pipe string and the borehole of the wellbore.

Spacer Fluids

Effective and complete removal of the drilling mud is required for a successful cement job. Spacer fluids are used to displace the drilling fluid from the well before cementing operation. The drilling fluid can be either water-based or oil-based system.

In the case of oil-based fluids, it is important to displace them completely from well, otherwise they will contaminate the cement slurry, which can eventually lead to issues such as incompatibility, poor bonding as well as suppression of compressive strength development. The presence oil layer over the casing may affect the bonding between the casing and cement and lead to formation of micro channels.

A surfactant is used in a spacer to enhance the compatibility between the spacer and oil-based drilling fluid. A surfactant also helps to change the interface between the mud and spacer from an oil-external emulsion to a water-external. In the past, a surfactant package comprising DSS-A (oil soluble), DSS-B (water soluble), and SEM-8 (water soluble) has been used extensively. It is desirable to use fewer surfactants in order to minimize the costs and associated expenses, such as transportation. In addition, there is a need for an environment friendly, salt-tolerant surfactant composition for spacer fluids.

Inorganic Salts in Spacer Fluids

Spacer fluids are often formed with water, seawater, or, for various reasons, inorganic salts such as NaCl or $CaCl_2$ may be added. It is important that a surfactant for a spacer fluid be compatible for use with seawater or having other inorganic salts dissolved in the water. Not all surfactants are compatible for use with dissolved salts.

SUMMARY OF THE INVENTION

A spacer fluid is provided, the fluid comprising:
(a) water; and
(b) an alkyl polyglycoside derivative, wherein the alkyl polyglycoside derivative is selected from the group consisting of sorbitan fatty acids, functionalized sulfonates, functionalized betaines, an inorganic salt of any of the foregoing, and any combination of any of the foregoing. Preferably, the spacer fluid additionally comprises a solid particulate, such as a weighting agent.

A method of displacing an oil-based drilling mud from a portion of a well is provided, the method comprising the steps of: (A) forming a spacer fluid according to the invention; and (B) introducing the spacer fluid into the well.

These and other aspects of the invention will be apparent to one skilled in the art upon reading the following detailed description. While the invention is susceptible to various modifications and alternative forms, specific embodiments thereof will be described in detail and shown by way of example. It should be understood, however, that it is not intended to limit the invention to the particular forms disclosed, but, on the contrary, the invention is to cover all modifications and alternatives falling within the spirit and scope of the invention as expressed in the appended claims.

BRIEF DESCRIPTION OF THE DRAWING

The accompanying drawing is incorporated into the specification to help illustrate examples according to the presently most-preferred embodiment of the invention.

FIG. 1 is a representative chemical structure of a sorbitan oleate polyglucoside, which is an example of the class of polyglycoside derivatives for use in a spacer fluid according to the invention.

DETAILED DESCRIPTION OF PRESENTLY PREFERRED EMBODIMENTS AND BEST MODE

Definitions and Usages
General Interpretation

The words or terms used herein have their plain, ordinary meaning in the field of this disclosure, except to the extent explicitly and clearly defined in this disclosure or unless the specific context otherwise requires a different meaning.

If there is any conflict in the usages of a word or term in this disclosure and one or more patent(s) or other documents that may be incorporated by reference, the definitions that are consistent with this specification should be adopted.

The words "comprising," "containing," "including," "having," and all grammatical variations thereof are intended to have an open, non-limiting meaning. For example, a composition comprising a component does not exclude it from having additional components, an apparatus comprising a part does not exclude it from having additional parts, and a method having a step does not exclude it having additional steps. When such terms are used, the compositions, apparatuses, and methods that "consist essentially of" or "consist of" the specified components, parts, and steps are specifically included and disclosed.

The indefinite articles "a" or "an" mean one or more than one of the component, part, or step that the article introduces.

Whenever a numerical range of degree or measurement with a lower limit and an upper limit is disclosed, any number and any range falling within the range is also intended to be specifically disclosed. For example, every range of values (in the form "from a to b," or "from about a to about b," or "from about a to b," "from approximately a to b," and any similar expressions, where "a" and "b" represent numerical values of degree or measurement) is to be understood to set forth every number and range encompassed within the broader range of values.

It should be understood that algebraic variables and other scientific symbols used herein are selected arbitrarily or according to convention. Other algebraic variables can be used.

Terms such as "first," "second," "third," etc. are assigned arbitrarily and are merely intended to differentiate between two or more components, parts, or steps that are otherwise similar or corresponding in nature, structure, function, or action. For example, the words "first" and "second" serve no other purpose and are not part of the name or description of the following name or descriptive terms. The mere use of the term "first" does not require that there be any "second" similar or corresponding component, part, or step. Similarly, the mere use of the word "second" does not require that there be any "first" or "third" similar or corresponding component, part, or step. Further, it is to be understood that the mere use of the term "first" does not require that the element or step be the very first in any sequence, but merely that it is at least one of the elements or steps. Similarly, the mere use of the terms "first" and "second" does not necessarily require any sequence. Accordingly, the mere use of such terms does not exclude intervening elements or steps between the "first" and "second" elements or steps, etc.

The control or controlling of a condition includes any one or more of maintaining, applying, or varying of the condition. For example, controlling the temperature of a substance can include heating, cooling, or thermally insulating the substance.

Oil and Gas Reservoirs

In the context of production from a well, "oil" and "gas" are understood to refer to crude oil and natural gas, respectively. Oil and gas are naturally occurring hydrocarbons in certain subterranean formations.

A "subterranean formation" is a body of rock that has sufficiently distinctive characteristics and is sufficiently continuous for geologists to describe, map, and name it.

A subterranean formation having a sufficient porosity and permeability to store and transmit fluids is sometimes referred to as a "reservoir."

A subterranean formation containing oil or gas may be located under land or under the seabed off shore. Oil and gas reservoirs are typically located in the range of a few hundred feet (shallow reservoirs) to a few tens of thousands of feet (ultra-deep reservoirs) below the surface of the land or seabed.

Well Servicing and Well Fluids

To produce oil or gas from a reservoir, a wellbore is drilled into a subterranean formation, which may be the reservoir or adjacent to the reservoir.

Generally, well services include a wide variety of operations that may be performed in oil, gas, geothermal, or water wells, such as drilling, cementing, completion, and intervention. Well services are designed to facilitate or enhance the production of desirable fluids such as oil or gas from or through a subterranean formation. A well service usually involves introducing a well fluid into a well.

Drilling is the process of drilling the wellbore. After a portion of the wellbore is drilled, sections of steel pipe, referred to as casing, which are slightly smaller in diameter than the borehole, are placed in at least the uppermost portions of the wellbore. The casing provides structural integrity to the newly drilled borehole.

Cementing is a common well operation. For example, hydraulic cement compositions can be used in cementing operations in which a string of pipe, such as casing or liner, is cemented in a wellbore. The cement stabilizes the pipe in the wellbore and prevents undesirable migration of fluids along the annulus between the wellbore and the outside of the casing or liner from one zone along the wellbore to the next. Where the wellbore penetrates into a hydrocarbon-bearing zone of a subterranean formation, the casing can later be perforated to allow fluid communication between the zone and the wellbore. The cemented casing also enables subsequent or remedial separation or isolation of one or more production zones of the wellbore by using downhole tools, such as packers or plugs, or by using other techniques, such as forming sand plugs or placing cement in the perforations. Hydraulic cement compositions can also be utilized in intervention operations, such as in plugging highly permeable zones, or fractures in zones, that may be producing too much water, plugging cracks or holes in pipe strings, and the like.

Completion is the process of making a well ready for production or injection. This principally involves preparing a zone of the wellbore to the required specifications, running in the production tubing and associated downhole equipment, as well as perforating and stimulating as required.

Intervention is any operation carried out on a well during or at the end of its productive life that alters the state of the well or well geometry, provides well diagnostics, or manages the production of the well.

Workover can broadly refer to any kind of well intervention that involves invasive techniques, such as wireline, coiled tubing, or snubbing. More specifically, however, workover usually refers to a process of pulling and replacing a completion.

Well Terms

A "well" includes a wellhead and at least one wellbore from the wellhead penetrating the earth. The "wellhead" is the surface termination of a wellbore, which surface may be on land or on a seabed.

A "well site" is the geographical location of a wellhead of a well. It may include related facilities, such as a tank battery, separators, compressor stations, heating or other equipment, and fluid pits. If offshore, a well site can include a platform.

The "wellbore" refers to the drilled hole, including any cased or uncased portions of the well or any other tubulars in the well. The "borehole" usually refers to the inside wellbore wall, that is, the rock surface or wall that bounds the drilled hole. A wellbore can have portions that are vertical, horizontal, or anything in between, and it can have portions that are straight, curved, or branched. As used herein, "uphole," "downhole," and similar terms are relative to the direction of the wellhead, regardless of whether a wellbore portion is vertical or horizontal.

A wellbore can be used as a production or injection wellbore. A production wellbore is used to produce hydrocarbons from the reservoir. An injection wellbore is used to inject a fluid, e.g., liquid water or steam, to drive oil or gas to a production wellbore.

As used herein, introducing "into a well" means introducing at least into and through the wellhead. According to various techniques known in the art, tubulars, equipment, tools, or well fluids can be directed from the wellhead into any desired portion of the wellbore.

As used herein, the word "tubular" means any kind of structural body in the general form of a tube. Examples of tubulars include, but are not limited to, a drill pipe, a casing, a tubing string, a line pipe, and a transportation pipe. Tubulars can also be used to transport fluids such as oil, gas, water, liquefied methane, coolants, and heated fluids into or out of a subterranean formation. For example, a tubular can be placed underground to transport produced hydrocarbons or water from a subterranean formation to another location. Tubulars can be of any suitable body material, but in the oilfield they are most commonly of steel.

As used herein, the term "annulus" means the space between two generally cylindrical objects, one inside the other. The objects can be concentric or eccentric. Without limitation, one of the objects can be a tubular and the other object can be an enclosed conduit. The enclosed conduit can be a wellbore or borehole or it can be another tubular. The following are some non-limiting examples illustrating some situations in which an annulus can exist. Referring to an oil, gas, or water well, in an open hole well, the space between the outside of a tubing string and the borehole of the wellbore is an annulus. In a cased hole, the space between the outside of the casing and the borehole is an annulus. In addition, in a cased hole there may be an annulus between the outside cylindrical portion of a tubular such as a production tubing string and the inside cylindrical portion of the casing. An annulus can be a space through which a fluid can flow or it can be filled with a material or object that blocks fluid flow, such as a packing element. Unless otherwise clear from the context, as used herein an "annulus" is a space through which a fluid can flow.

As used herein, a "well fluid" broadly refers to any fluid adapted to be introduced into a well for any purpose. A well fluid can be, for example, a drilling fluid, a setting composition, a treatment fluid, or a spacer fluid. If a well fluid is to be used in a relatively small volume, for example less than about 200 barrels (about 8,400 US gallons or about 32 $m^3$), it is sometimes referred to as a wash, dump, slug, or pill.

Drilling fluids, also known as drilling muds or simply "muds," are typically classified according to their base fluid, that is, the nature of the continuous phase. A water-based mud ("WBM") has a water phase as the continuous phase. The water can be brine. A brine-based drilling fluid is a water-based mud in which the aqueous component is brine. In some cases, oil may be emulsified in a water-based drilling mud. An oil-based mud ("OBM") has an oil phase as the continuous phase. In some cases, a water phase is emulsified in the oil-based mud.

As used herein, the word "treatment" refers to any treatment for changing a condition of a portion of a pipeline, a wellbore, or a subterranean formation adjacent a wellbore; however, the word "treatment" does not necessarily imply any particular treatment purpose. A treatment usually involves introducing a well fluid for the treatment, in which case it may be referred to as a treatment fluid, into a well. As used herein, a "treatment fluid" is a well fluid used in a treatment. The word "treatment" in the term "treatment fluid" does not necessarily imply any particular treatment or action by the fluid.

As used herein, the terms spacer fluid, wash fluid, and inverter fluid can be used interchangeably. A spacer fluid is a fluid used to physically separate one special-purpose fluid from another. It may be undesirable for one special-purpose fluid to mix with another used in the well, so a spacer fluid compatible with each is used between the two. A spacer fluid is usually used when changing between well fluids used in a well.

For example, a spacer fluid is used to change from a drilling fluid during drilling to cementing composition during cementing operations in the well. In case of an oil-based drilling fluid, it should be kept separate from a water-based cementing fluid. In changing to the latter fluid, a chemically treated water-based spacer fluid is usually used to separate the drilling fluid from the water-based cementing fluid.

A spacer fluid specially designed to separate a special purpose oil-external fluid from a special purpose water-external fluid may be termed as an inverter fluid. Inverter fluids may be so designed that the diffused contaminated layer between both the special purpose fluids has progressive variation in properties like solids carrying capability, electrical conductivity, rheology, and chemical potential. In other words, inverter fluids may be ideally designed to be fully compatible physically and chemically with either or both of the special purpose fluids under the simulated conditions of pressure, temperature and shear. Compatibility may be warranted by rheological investigations or visual observations at all intermediate compositions. Unwanted flocculation, coagulation, or excessive thinning of the admixture compared to the original fluids is typically considered to be a signature for incompatibility.

Volumes of spacer fluid that are consumed in channel lengths due to contamination process are not sufficient to clean wellbore surfaces or change wettability. These volumes should be considered sacrificial and the amount of pure uncontaminated spacer is estimated from surface wettability techniques.

A "portion" of a well, tubular, or pipeline refers to any downhole portion of the well or any portion of the length of a pipeline or any portion of a tubular, as the case may be.

A "zone" refers to an interval of rock along a wellbore that is differentiated from uphole and downhole zones based on hydrocarbon content or other features, such as permeability, composition, perforations or other fluid communication with the wellbore, faults, or fractures. A zone of a wellbore that penetrates a hydrocarbon-bearing zone that is capable of producing hydrocarbon is referred to as a "production zone." A "treatment zone" refers to an interval of rock along a wellbore into which a well fluid is directed to flow from the wellbore. As used herein, "into a treatment zone" means into and through the wellhead and, additionally, through the wellbore and into the treatment zone.

As used herein, a "downhole" fluid (or gel) is an in-situ fluid in a well, which may be the same as a well fluid at the time it is introduced, or a well fluid mixed with another fluid downhole, or a fluid in which chemical reactions are occurring or have occurred in-situ downhole.

Fluid loss refers to the undesirable leakage of a fluid phase of any type of well fluid into the permeable matrix of a zone, which zone may or may not be a treatment zone. Fluid-loss control refers to treatments designed to reduce such undesirable leakage.

Generally, the greater the depth of the formation, the higher the static temperature and pressure of the formation. Initially, the static pressure equals the initial pressure in the formation before production. After production begins, the static pressure approaches the average reservoir pressure.

Deviated wells are wellbores inclined at various angles to the vertical. Complex wells include inclined wellbores in high-temperature or high-pressure downhole conditions.

A "design" refers to the estimate or measure of one or more parameters planned or expected for a particular fluid or stage of a well service or treatment. For example, a fluid can be designed to have components that provide a minimum density or viscosity for at least a specified time under expected downhole conditions. A well service may include design parameters such as fluid volume to be pumped, required pumping time for a treatment, or the shear conditions of the pumping.

The term "design temperature" refers to an estimate or measurement of the actual temperature at the downhole environment during the time of a treatment. For example, the design temperature for a well treatment takes into account not only the bottom hole static temperature ("BHST"), but also the effect of the temperature of the well fluid on the BHST during treatment. The design temperature for a well fluid is sometimes referred to as the bottom hole circulation temperature ("BHCT"). Because well fluids may be considerably cooler than BHST, the difference between the two temperatures can be quite large. Ultimately, if left undisturbed, a subterranean formation will return to the BHST.

Two fluids are incompatible if undesirable physical or chemical interactions occur when the fluids are mixed. Incompatibility is characterized by undesirable changes in apparent viscosity and shear stresses. When apparent viscosity of the mixed fluids is greater than apparent viscosity of each individual fluid, they are said to be incompatible at the tested shear rate.

Substances, Chemicals, and Derivatives

A substance can be a pure chemical or a mixture of two or more different chemicals.

As used herein, a "polymer" or "polymeric material" includes polymers, copolymers, terpolymers, etc. In addition, the term "copolymer" as used herein is not limited to the combination of polymers having two monomeric units, but includes any combination of monomeric units, e.g., terpolymers, tetrapolymers, etc.

As used herein, "modified" or "derivative" means a chemical compound formed by a chemical process from a parent compound, wherein the chemical backbone skeleton of the parent compound is retained in the derivative. The chemical process preferably includes at most a few chemical reaction steps, and more preferably only one or two chemical reaction steps. As used herein, a "chemical reaction step" is a chemical reaction between two chemical reactant species to produce at least one chemically different species from the reactants (regardless of the number of transient chemical species that may be formed during the reaction). An example of a chemical step is a substitution reaction. Substitution on the reactive sites of a polymeric material may be partial or complete.

Physical States and Phases

As used herein, "phase" is used to refer to a substance having a chemical composition and physical state that is distinguishable from an adjacent phase of a substance having a different chemical composition or a different physical state.

As used herein, if not other otherwise specifically stated, the physical state or phase of a substance (or mixture of substances) and other physical properties are determined at a temperature of 77° F. (25° C.) and a pressure of 1 atmosphere (Standard Laboratory Conditions) without applied shear.

Particles and Particulates

As used herein, a "particle" refers to a body having a finite mass and sufficient cohesion such that it can be considered as an entity but having relatively small dimensions. A particle can be of any size ranging from molecular scale to macroscopic, depending on context.

A particle can be in any physical state. For example, a particle of a substance in a solid state can be as small as a few molecules on the scale of nanometers up to a large particle on the scale of a few millimeters, such as large grains of sand. Similarly, a particle of a substance in a liquid state can be as small as a few molecules on the scale of nanometers up to a large drop on the scale of a few millimeters. A particle of a substance in a gas state is a single atom or molecule that is separated from other atoms or molecules such that intermolecular attractions have relatively little effect on their respective motions.

As used herein, particulate or particulate material refers to matter in the physical form of distinct particles in a solid or liquid state (which means such an association of a few atoms or molecules). As used herein, a particulate is a grouping of particles having similar chemical composition and particle size ranges anywhere in the range of about 0.5 micrometer (500 nm), e.g., microscopic clay particles, to about 3 millimeters, e.g., large grains of sand.

A particulate can be of solid or liquid particles. As used herein, however, unless the context otherwise requires, particulate refers to a solid particulate. Of course, a solid particulate is a particulate of particles that are in the solid physical state, that is, the constituent atoms, ions, or molecules are sufficiently restricted in their relative movement to result in a fixed shape for each of the particles.

Dispersions

A dispersion is a system in which particles of a substance of one chemical composition and physical state are dispersed in another substance of a different chemical composition or physical state. In addition, phases can be nested. If a substance has more than one phase, the most external phase is referred to as the continuous phase of the substance as a whole, regardless of the number of different internal phases or nested phases.

A dispersion can be classified in different ways, including, for example, based on the size of the dispersed particles, the uniformity or lack of uniformity of the dispersion, and, if a fluid, by whether or not precipitation occurs.

Classification of Dispersions: Heterogeneous and Homogeneous

A dispersion is considered to be heterogeneous if the dispersed particles are not dissolved and are greater than about 1 nanometer in size. (For reference, the diameter of a molecule of toluene is about 1 nm and a molecule of water is about 0.3 nm).

Heterogeneous dispersions can have gas, liquid, or solid as an external phase. For example, in a case where the dispersed-phase particles are liquid in an external phase that is another liquid, this kind of heterogeneous dispersion is more particularly referred to as an emulsion. A solid dispersed phase in a continuous liquid phase is referred to as a sol, suspension, or slurry, partly depending on the size of the dispersed solid particulate.

A dispersion is considered to be homogeneous if the dispersed particles are dissolved in solution or the particles are less than about 1 nanometer in size. Even if not dissolved, a dispersion is considered to be homogeneous if the dispersed particles are less than about 1 nanometer in size.

Classification of Heterogeneous Dispersions: Suspensions and Colloids

Heterogeneous dispersions can be further classified based on the dispersed particle size.

A heterogeneous dispersion is a "suspension" where the dispersed particles are larger than about 50 micrometers. Such particles can be seen with a microscope, or if larger than about 50 micrometers (0.05 mm), with the unaided human eye. The dispersed particles of a suspension in a liquid external phase may eventually separate on standing, e.g., settle in cases where the particles have a higher density than the liquid phase. Suspensions having a liquid external phase are essentially unstable from a thermodynamic point of view; however, they can be kinetically stable over a long period depending on temperature and other conditions.

A heterogeneous dispersion is a "colloid" where the dispersed particles range up to about 50 micrometer (50,000 nanometers) in size. The dispersed particles of a colloid are so small that they settle extremely slowly, if ever. In some cases, a colloid can be considered as a homogeneous mixture. This is because the distinction between "dissolved" and "particulate" matter can be sometimes a matter of theoretical approach, which affects whether or not it is considered homogeneous or heterogeneous.

Classification of Homogeneous Dispersions: Solutions

A solution is a special type of homogeneous mixture. A solution is considered homogeneous: (a) because the ratio of solute to solvent is the same throughout the solution; and (b) because solute will never settle out of solution, even under powerful centrifugation, which is due to intermolecular attraction between the solvent and the solute. An aqueous solution, for example, saltwater, is a homogenous solution in which water is the solvent and salt is the solute.

One may also refer to the solvated state, in which a solute ion or molecule is complexed by solvent molecules. A chemical that is dissolved in solution is in a solvated state. The solvated state is distinct from dissolution and solubility. Dissolution is a kinetic process, and is quantified by its rate. Solubility quantifies the concentration of the solute at which there is dynamic equilibrium between the rate of dissolution and the rate of precipitation of the solute. Dissolution and solubility can be dependent on temperature and pressure, and may be dependent on other factors, such as salinity or pH of an aqueous phase.

Hydratability or Solubility

As referred to herein, "hydratable" means capable of being hydrated by contacting the hydratable agent with water. Regarding a hydratable agent that includes a polymer, this means, among other things, to associate sites on the polymer with water molecules and to unravel and extend the polymer chain in the water.

A substance is considered to be "soluble" in a liquid if at least 10 grams of the substance can be hydrated or dissolved in one liter of the liquid (which is at least 83 ppt) when tested at 77° F. and 1 atmosphere pressure for 2 hours, considered to be "insoluble" if less than 1 gram per liter (which is less than 8.3 ppt), and considered to be "sparingly soluble" for intermediate solubility values.

As will be appreciated by a person of skill in the art, the hydratability, dispersibility, or solubility of a substance in water can be dependent on the salinity, pH, or other substances in the water. Accordingly, the salinity, pH, and additive selection of the water can be modified to facilitate the hydratability, dispersibility, or solubility of a substance in aqueous solution. To the extent not specified, the hydratability, dispersibility, or solubility of a substance in water is determined in deionized water, at neutral pH, and without any other additives.

As used herein, the term "polar" means having a dielectric constant greater than 30. The term "relatively polar" means having a dielectric constant greater than about 2 and less than about 30. "Non-polar" means having a dielectric constant less than 2.

Fluids

A fluid can be a single phase or a dispersion. In general, a fluid is an amorphous substance that is or has a continuous phase of particles that are smaller than about 1 micrometer that tends to flow and to conform to the outline of its container.

Examples of fluids are gases and liquids. A gas (in the sense of a physical state) refers to an amorphous substance that has a high tendency to disperse (at the molecular level) and a relatively high compressibility. A liquid refers to an amorphous substance that has little tendency to disperse (at the molecular level) and relatively high incompressibility. The tendency to disperse is related to Intermolecular Forces (also known as van der Waal's Forces). (A continuous mass of a particulate, e.g., a powder or sand, can tend to flow as a fluid depending on many factors such as particle size distribution, particle shape distribution, the proportion and nature of any wetting liquid or other surface coating on the particles, and many other variables. Nevertheless, as used herein, a fluid does not refer to a continuous mass of particulate as the sizes of the solid particles of a mass of a particulate are too large to be appreciably affected by the range of Intermolecular Forces.)

Every fluid inherently has at least a continuous phase. A fluid can have more than one phase. The continuous phase of a well fluid is a liquid under Standard Laboratory Conditions. For example, a well fluid can be in the form of a suspension (larger solid particles dispersed in a liquid phase), a sol (smaller solid particles dispersed in a liquid phase), an emulsion (liquid particles dispersed in another liquid phase), or a foam (a gas phase dispersed in a liquid phase).

The continuous phase of a fluid characterizes its relative permittivity. Permittivity is a measure of the ability of a material to be polarized by an electric field. The dielectric constant of a material is the ratio of its permittivity to the permittivity of vacuum. The dielectric constant is therefore also known as the relative permittivity of the material.

As used herein, a "water-based" fluid means that water or an aqueous solution is the dominant material of the continuous phase, that is, greater than 50% by weight, of the continuous phase of the fluid based on the combined weight of water and any other solvents in the phase (that is, excluding the weight of any dissolved solids).

In contrast, an "oil-based" fluid means that oil is the dominant material by weight of the continuous phase of the fluid. In this context, the oil of an oil-based fluid can be any oil.

In the context of a well fluid, oil is understood to refer to an oil liquid, whereas gas is understood to refer to a physical state of a substance, in contrast to a liquid. In this context, an oil is any substance that is liquid under Standard Laboratory Conditions, is hydrophobic, and soluble in organic solvents. Oils have a high carbon and hydrogen content and are non-polar substances. This general definition includes classes such as petrochemical oils, vegetable oils, and many organic solvents. All oils can be traced back to organic sources.

Apparent Viscosity of a Fluid

Viscosity is a measure of the resistance of a fluid to flow. In everyday terms, viscosity is "thickness" or "internal friction." Thus, pure water is "thin," having a relatively low viscosity whereas honey is "thick," having a relatively higher viscosity. Put simply, the less viscous the fluid is, the greater its ease of movement (fluidity). More precisely, viscosity is defined as the ratio of shear stress to shear rate.

A fluid moving along solid boundary will incur a shear stress on that boundary. The no-slip condition dictates that the speed of the fluid at the boundary (relative to the boundary) is zero, but at some distance from the boundary the flow speed must equal that of the fluid. The region between these two points is aptly named the boundary layer. For all Newtonian fluids in laminar flow, the shear stress is proportional to the strain rate in the fluid where the viscosity is the constant of proportionality. However for non-Newtonian fluids, this is no longer the case as for these fluids the viscosity is not constant. The shear stress is imparted onto the boundary as a result of this loss of velocity.

A Newtonian fluid (named after Isaac Newton) is a fluid for which stress versus strain rate curve is linear and passes through the origin. The constant of proportionality is known as the viscosity. Examples of Newtonian fluids include water and most gases. Newton's law of viscosity is an approximation that holds for some substances but not others.

Non-Newtonian fluids exhibit a more complicated relationship between shear stress and velocity gradient (i.e., shear rate) than simple linearity. Thus, there exist a number of forms of non-Newtonian fluids. Shear thickening fluids have an apparent viscosity that increases with increasing the rate of shear. Shear thinning fluids have a viscosity that decreases with increasing rate of shear. Thixotropic fluids become less viscous over time at a constant shear rate. Rheopectic fluids become more viscous over time at a constant shear rate. A Bingham plastic is a material that behaves as a solid at low stresses but flows as a viscous fluid at high yield stresses.

Most well fluids are non-Newtonian fluids. Accordingly, the apparent viscosity of a fluid applies only under a particular set of conditions including shear stress versus shear rate, which must be specified or understood from the context. As used herein, a reference to viscosity is actually a reference to an apparent viscosity. Apparent viscosity is commonly expressed in units of mPa·s or centipoise (cP), which are equivalent.

Like other physical properties, the viscosity of a Newtonian fluid or the apparent viscosity of a non-Newtonian fluid may be highly dependent on the physical conditions, primarily temperature and pressure.

Viscosity and Gel Measurements

There are numerous ways of measuring and modeling viscous properties, and new developments continue to be made. The methods depend on the type of fluid for which viscosity is being measured. A typical method for quality assurance or quality control (QA/QC) purposes uses a couette device, such as a FANN™ Model 35 or Model 50 viscometer or a CHANDLER™ 5550 HPHT viscometer. Such a viscometer measures viscosity as a function of time, temperature, and shear rate. The viscosity-measuring instrument can be calibrated using standard viscosity silicone oils or other standard viscosity fluids.

Due to the geometry of most common viscosity-measuring devices, however, solid particulate, especially if larger than silt (larger than 74 micron), would interfere with the measurement on some types of measuring devices. Therefore, the viscosity of a fluid containing such solid particulate is usually inferred and estimated by measuring the viscosity of a test fluid that is similar to the fracturing fluid without any proppant or gravel that would otherwise be included. However, as suspended particles (which can be solid, gel, liquid, or gaseous bubbles) usually affect the viscosity of a fluid, the actual viscosity of a suspension is usually somewhat different from that of the continuous phase.

Unless otherwise specified, the apparent viscosity of a fluid (excluding any suspended solid particulate larger than silt) is measured with a FANN™ Model 35 type viscometer using an R1 rotor, B1 bob, and F1 torsion spring at a shear rate of 40 1/s, and at a temperature of 77° F. (25° C.) and a pressure of 1 atmosphere.

A substance is considered to be a fluid if it has an apparent viscosity less than 5,000 mPa·s (5,000 cP) (independent of any gel characteristic). For reference, the viscosity of pure water is about 1 mPa·s (1 cP).

General Measurement Terms

Unless otherwise specified or unless the context otherwise clearly requires, any ratio or percentage means by weight.

Unless otherwise specified or unless the context otherwise clearly requires, the phrase "by weight of the water" means the weight of the water of an aqueous phase of the fluid without the weight of any viscosity-increasing agent, dissolved salt, suspended particulate, or other materials or additives that may be present in the water.

As used herein, "% wt/vol" means the mass-volume percentage, sometimes referred to as weight-volume percentage or percent weight per volume and often abbreviated as % m/v or % w/v, which describes the mass of the solute in g per 100 mL of the liquid. Mass-volume percentage is often used for solutions made from a solid solute dissolved in a liquid. For example, a 40% w/v sugar solution contains 40 g of sugar per 100 mL of liquid.

If there is any difference between U.S. or Imperial units, U.S. units are intended.

Unless otherwise specified, mesh sizes are in U.S. Standard Mesh.

The micrometer (μm) may sometimes be referred to herein as a micron.

The conversion between pound per gallon (lb/gal or ppg) and kilogram per cubic meter ($kg/m^3$) is: 1 lb/gal=(0.4536 kg/lb)×(gal/0.003785 $m^3$)=120 $kg/m^3$.

Emulsions

An emulsion is a fluid including a dispersion of immiscible liquid particles in an external liquid phase. In addition, the proportion of the external and internal phases is above the solubility of either in the other. A chemical can be included to reduce the interfacial tension between the two immiscible liquids to help with stability against coalescing of the internal liquid phase, in which case the chemical may be referred to as a surfactant or more particularly as an emulsifier or emulsifying agent.

In the context of an emulsion, a "water phase" refers to a phase of water or an aqueous solution and an "oil phase" refers to a phase of any non-polar, organic liquid that is immiscible with water, usually an oil.

An emulsion can be an oil-in-water (o/w) type or water-in-oil (w/o) type. A water-in-oil emulsion is sometimes referred to as an invert emulsion.

A stable emulsion is an emulsion that will not cream, flocculate, or coalesce under certain conditions, including time and temperature. As used herein, the term "cream" means at least some of the droplets of a dispersed phase converge towards the surface or bottom of the emulsion (depending on the relative densities of the liquids making up the continuous and dispersed phases). The converged droplets maintain a discrete droplet form. As used herein, the term "flocculate" means at least some of the droplets of a dispersed phase combine to form small aggregates in the emulsion. As used herein, the term "coalesce" means at least some of the droplets of a dispersed phase combine to form larger drops in the emulsion.

Surfactants

Surfactants are compounds that lower the surface tension of a liquid, the interfacial tension between two liquids, or that between a liquid and a solid, or that between a liquid and a gas. Surfactants may act as detergents, wetting agents, emulsifiers, foaming agents, and dispersants.

Surfactants are usually organic compounds that are amphiphilic, meaning they contain both hydrophobic groups ("tails") and hydrophilic groups ("heads"). Therefore, a surfactant contains both a water-insoluble (or oil soluble) portion and a water-soluble portion.

A surfactant package can include one or more different chemical surfactants.

In a water phase, surfactants form aggregates, such as micelles, where the hydrophobic tails form the core of the aggregate and the hydrophilic heads are in contact with the surrounding liquid. The aggregates can be formed in various shapes such as spherical or cylindrical micelles or bilayers. The shape of the aggregation depends upon various factors such as the chemical structure of the surfactant (e.g., the balance of the sizes of the hydrophobic tail and hydrophilic head), the concentration of the surfactant, nature of counter ions, ionic salt concentration, co-surfactants, solubilized components (if any), pH, and temperature.

As used herein, the term micelle includes any structure that minimizes the contact between the lyophobic ("solvent-repelling") portion of a surfactant molecule and the solvent, for example, by aggregating the surfactant molecules into structures such as spheres, cylinders, or sheets, wherein the lyophobic portions are on the interior of the aggregate structure and the lyophilic ("solvent-attracting") portions are on the exterior of the structure. Micelles can function, among other purposes, to stabilize emulsions, break emulsions, stabilize foam, change the wettability of a surface, or solubilize certain materials.

Emulsifiers

As used herein, an "emulsifier" refers to a type of surfactant that helps prevent the droplets of the dispersed phase of an emulsion from flocculating or coalescing in the emulsion. As used herein, an emulsifier refers to a chemical or mixture of chemicals that helps prevent the droplets of the dispersed phase of an emulsion from flocculating or coalescing in the emulsion. As used herein, an "emulsifier" or "emulsifying agent" does not mean or include a hydrophobic particulate.

An emulsifier can be or include a cationic, a zwitterionic, or a nonionic emulsifier.

The hydrophilic-lipophilic balance ("HLB") of a surfactant is a measure of the degree to which it is hydrophilic or lipophilic, determined by calculating values for the different regions of the molecule, as described by Griffin in 1949 and 1954. Other methods have been suggested, notably in 1957 by Davies.

In general, Griffin's method for non-ionic surfactants as described in 1954 works as follows:

$$HLB=20*Mh/M$$

where Mh is the molecular mass of the hydrophilic portion of the molecule, and M is the molecular mass of the whole molecule, giving a result on a scale of 0 to 20. An HLB value of 0 corresponds to a completely lipidphilic/hydrophobic molecule, and a value of 20 corresponds to a completely hydrophilic/lypidphobic molecule. Griffin W C: "Classification of Surface-Active Agents by 'HLB,'" Journal of the Society of Cosmetic Chemists 1 (1949): 311. Griffin W C: "Calculation of HLB Values of Non-Ionic Surfactants," Journal of the Society of Cosmetic Chemists 5 (1954): 249.

The HLB (Griffin) value can be used to predict the surfactant properties of a molecule, where a value less than 10 indicates that the surfactant molecule is lipid soluble (and water insoluble), whereas a value greater than 10 indicates that the surfactant molecule is water soluble (and lipid insoluble).

In addition, the HLB (Griffin) value can be used to predict the uses of the molecule, where: a value from 4 to 8 indicates an anti-foaming agent, a value from 7 to 11 indicates a W/O (water in oil) emulsifier, a value from 12 to 16 indicates O/W (oil in water) emulsifier, a value from 11 to 14 indicates a wetting agent, a value from 12 to 15 indicates a detergent, and a value of 16 to 20 indicates a solubiliser or hydrotrope.

An emulsifier can be or include a cationic, a zwitterionic, or a nonionic emulsifier. A emulsifier package can include one or more different chemical emulsifiers.

An emulsifier or emulsifier package is preferably in a concentration of at least 1% by weight of the water of the emulsion. More preferably, the emulsifier is in a concentration in the range of 1% to 10% by weight of the water.

The emulsion can also include other additives. For example, the emulsion can contain a freezing-point depressant. More preferably, the freezing point depressant is for the water of the continuous phase. Preferably, the freezing-point depressant is selected from the group consisting of water soluble ionic salts, alcohols, glycols, urea, and any combination thereof in any proportion.

The emulsion can also contain water-soluble salt(s) at a high-ionic strength for other purposes, for example, to increase the density of the continuous phase of the emulsion. Preferably, the water-soluble salt is selected from the group consisting of: an alkali metal halide, alkaline earth metal halide, alkali metal formate, and any combination thereof.

Preferably, an emulsion should be stable under one or more of certain conditions commonly encountered in the storage and use of such an emulsion composition for a well treatment operation.

Biodegradability

Biodegradable means the process by which complex molecules are broken down by micro-organisms to produce simpler compounds. Biodegradation can be either aerobic (with oxygen) or anaerobic (without oxygen). The potential for biodegradation is commonly measured on well fluids or their components to ensure that they do not persist in the environment. A variety of tests exist to assess biodegradation.

As used herein, a substance is considered "biodegradable" if the substance passes a ready biodegradability test or an inherent biodegradability test. It is preferred that a substance is first tested for ready biodegradability, and only if the substance does not pass at least one of the ready biodegradability tests then the substance is tested for inherent biodegradability.

In accordance with Organisation for Economic Co-operation and Development ("OECD") guidelines, the following six tests permit the screening of chemicals for ready biodegradability. As used herein, a substance showing more than 60% biodegradability in 28 days according to any one of the six ready biodegradability tests is considered a pass level for classifying it as "readily biodegradable," and it may be assumed that the substance will undergo rapid and ultimate degradation in the environment. The six ready biodegradability tests are: (1) 301A: DOC Die-Away; (2) 301B: CO2 Evolution (Modified Sturm Test); (3) 301C: MITI (I) (Ministry of International Trade and Industry, Japan); (4) 301D: Closed Bottle; (5) 301E: Modified OECD Screening; and (6) 301F: Manometric Respirometry. The six ready biodegradability tests are described below.

For the 301A test, a measured volume of inoculated mineral medium, containing 10 mg to 40 mg dissolved organic carbon per liter (DOC/l) from the substance as the nominal sole source of organic carbon, is aerated in the dark or diffuse light at 22±2° C. Degradation is followed by DOC analysis at frequent intervals over a 28-day period. The degree of biodegradation is calculated by expressing the concentration of DOC removed (corrected for that in the blank inoculum control) as a percentage of the concentration initially present. Primary biodegradation may also be calculated from supplemental chemical analysis for parent compound made at the beginning and end of incubation.

For the 301B test, a measured volume of inoculated mineral medium, containing 10 mg to 20 mg DOC or total organic carbon per liter from the substance as the nominal sole source of organic carbon is aerated by the passage of carbon dioxide-free air at a controlled rate in the dark or in diffuse light. Degradation is followed over 28 days by determining the carbon dioxide produced. The $CO_2$ is trapped in barium or sodium hydroxide and is measured by titration of the residual hydroxide or as inorganic carbon. The amount of carbon dioxide produced from the test substance (corrected for that derived from the blank inoculum) is expressed as a percentage of $ThCO_2$. The degree of biodegradation may also be calculated from supplemental DOC analysis made at the beginning and end of incubation.

For the 301C test, the oxygen uptake by a stirred solution, or suspension, of the substance in a mineral medium, inoculated with specially grown, unadapted micro-organisms, is measured automatically over a period of 28 days in a darkened, enclosed respirometer at 25+/−1° C. Evolved carbon dioxide is absorbed by soda lime. Biodegradation is expressed as the percentage oxygen uptake (corrected for blank uptake) of the theoretical uptake (ThOD). The percentage primary biodegradation is also calculated from supplemental specific chemical analysis made at the beginning and end of incubation, and optionally ultimate biodegradation by DOC analysis.

For the 301D test, a solution of the substance in mineral medium, usually at 2-5 milligrams per liter (mg/l), is inoculated with a relatively small number of micro-organisms from a mixed population and kept in completely full, closed bottles in the dark at constant temperature. Degradation is followed by analysis of dissolved oxygen over a 28 day period. The amount of oxygen taken up by the microbial population during biodegradation of the test substance, corrected for uptake by the blank inoculum run in parallel, is expressed as a percentage of ThOD or, less satisfactorily COD.

For the 301E test, a measured volume of mineral medium containing 10 to 40 mg DOC/l of the substance as the nominal sole source of organic carbon is inoculated with 0.5 ml effluent per liter of medium. The mixture is aerated in the dark or diffused light at 22+2° C. Degradation is followed by DOC analysis at frequent intervals over a 28 day period. The degree of biodegradation is calculated by expressing the concentration of DOC removed (corrected for that in the blank inoculums control) as a percentage of the concentration initially present. Primary biodegradation may also be calculated from supplemental chemical analysis for the parent compound made at the beginning and end of incubation.

For the 301F test, a measured volume of inoculated mineral medium, containing 100 mg of the substance per liter giving at least 50 to 100 mg ThOD/l as the nominal sole source of organic carbon, is stirred in a closed flask at a constant temperature (+1° C. or closer) for up to 28 days. The consumption of oxygen is determined either by measuring the quantity of oxygen (produced electrolytically) required to maintain constant gas volume in the respirometer flask or from the change in volume or pressure (or a combination of the two) in the apparatus. Evolved carbon dioxide is absorbed in a solution of potassium hydroxide or another suitable absorbent. The amount of oxygen taken up by the microbial population during biodegradation of the test substance (corrected for uptake by blank inoculum, run in parallel) is expressed as a percentage of ThOD or, less satisfactorily, COD. Optionally, primary biodegradation may also be calculated from supplemental specific chemical analysis made at the beginning and end of incubation, and ultimate biodegradation by DOC analysis.

In accordance with OECD guidelines, the following three tests permit the testing of chemicals for inherent biodegradability. As used herein, a substance with a biodegradation or biodegradation rate of >20% is regarded as "inherently primary biodegradable." A substance with a biodegradation or biodegradation rate of >70% is regarded as "inherently ultimate biodegradable." As used herein, a substance passes the inherent biodegradability test if the substance is either regarded as inherently primary biodegradable or inherently ultimate biodegradable when tested according to any one of three inherent biodegradability tests. The three tests are: (1) 302A: 1981 Modified SCAS Test; (2) 302B: 1992 Zahn- Wellens Test; and (3) 302C: 1981 Modified MITI Test. Inherent biodegradability refers to tests which allow prolonged exposure of the test compound to microorganisms, a more favorable test compound to biomass ratio, and chemical or other conditions which favor biodegradation. The three inherent biodegradability tests are described below:

For the 302A test, activated sludge from a sewage treatment plant is placed in an aeration (SCAS) unit. The substance and settled domestic sewage are added, and the mixture is aerated for 23 hours. The aeration is then stopped, the sludge allowed to settle and the supernatant liquor is removed. The sludge remaining in the aeration chamber is then mixed with a further aliquot of the substance and sewage and the cycle is repeated. Biodegradation is established by determination of the dissolved organic carbon content of the supernatant liquor. This value is compared with that found for the liquor obtained from a control tube dosed with settled sewage only.

For the 302B test, a mixture containing the substance, mineral nutrients, and a relatively large amount of activated sludge in aqueous medium is agitated and aerated at 20° C. to 25° C. in the dark or in diffuse light for up to 28 days. A blank control, containing activated sludge and mineral nutrients but no substance, is run in parallel. The biodegradation process is monitored by determination of DOC (or COD) in filtered samples taken at daily or other time intervals. The ratio of eliminated DOC (or COD), corrected for the blank, after each time interval, to the initial DOC value is expressed as the percentage biodegradation at the sampling time. The percentage biodegradation is plotted against time to give the biodegradation curve.

For the 302C test, an automated closed-system oxygen consumption measuring apparatus (BOD-meter) is used. The substance to be tested is inoculated in the testing vessels with micro-organisms. During the test period, the biochemical oxygen demand is measured continuously by means of a BOD-meter. Biodegradability is calculated on the basis of BOD and supplemental chemical analysis, such as measurement of the dissolved organic carbon concentration, concentration of residual chemicals, etc.

AS4351 is an Australian Standard in regards to the biodegradability of a product. Its purpose is to ensure that products are biodegradable and eco-friendly by requiring that products be tested by certified testing laboratories that at least 70% of the total ingredients used to make the product can readily biodegrade in 28 days. This standard is technically equivalent to ISO 7827-1994 and is based on OECD "Ready Biodegradability" tests 301A to 301E.

General Approach

The general structure of a sorbitan oleate polyglucoside is shown in FIG. 1 and below:

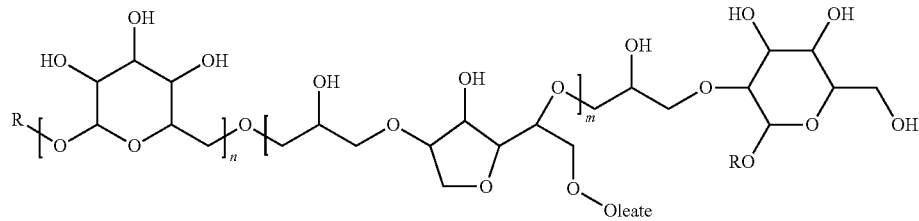

where each R is an alkyl group having 8 to 24 carbons, wherein the R groups can be the same or different, where the range of n is 2 to 20 (for the glucose units) and where the range of m is 1 to 10 (for the sorbitan oleate units).

A Sorbitan Oleate Decylpolyglucoside (SOD) is a sorbitan oleate polyglucoside wherein both R groups are decyl chains (C10). SODs are available with various HLB values, depending on the value of m for the sorbitan units. Two of these (herein designated "SOD-1" and "SOD-2") have been successfully tested in water-based spacer fluids, including in spacer fluids having an 18% salt solution. The results are discussed in detail below.

Material Information

| Name | Sorbitan Oleate Decylpolyglucoside |
|---|---|
| Concentration (% wt) | 70.00 (in aqueous solution) |
| pH | 7.0 |
| HLB | 5 (SOD-1), 12 (SOD-2) |
| Physical form | Liquid |

This material has been tested for biodegradability according to OECD 301 D. It undergo degradation >80% in 16 days. For oil field application, the requirement is at least 60% degradation in 30 days. Since it is readily degrades, it can be considered environment friendly.

This class of SOD surfactants are expected to be environment friendly, biodegradable, as they are derived from sugar sources. Such an SOD surfactant can be part of an effective surfactant package for a spacer fluid. Since the green chemicals are gaining much attention in the oil field industry, the new surfactant is commercially desirable. Applications include wells having a salt zone that need treatment with a spacer fluid to displace an oil-based mud.

Based on the successful testing with SOD-1 and SOD-2 as disclosed below, a person of skill in the art can extrapolate to certain types of alkyl polyglycoside derivatives that would be expected to have similar surfactant properties and be suitable for use according to the principles of this invention.

Alkyl polyglycosides ("APGs") are a class of non-ionic surfactants. When derived from glucose, alkyl polyglycosides are more specifically known as alkyl polyglucosides. Alkyl polyglucosides have the following general chemical structure, where m and n are variables:

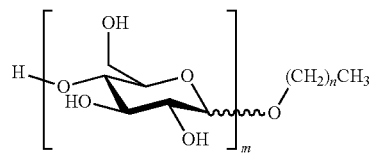

The chemical structure of alkyl polyglycosides derived from other sugar molecules is similar, except for the difference in the type of sugar molecule on which the polyglycoside is based.

Preferably, independently of the other parameters for the alkyl polyglycoside, the alkyl polyglycoside (APG) is derived from glucose, such that it is an alkyl polyglucoside.

For any type of alkyl polyglycoside, independently of the other parameters, preferably m is in the range of 2 to 20.

For any type of alkyl polyglycoside, independently of the other parameters, preferably n for the alkyl group is in the range of 8 to 24.

More preferably, the alkyl polyglycoside (APG) is an alkyl polyglucoside wherein preferably m is in the range of 2 to 20 and preferably n for the alkyl is in the range of 8 to 24.

More generally, the surfactant is an alkyl polyglycoside (APG) derivative selected from the group consisting of: sorbitan fatty acids; functionalized sulfonates, functionalized betaines, an inorganic salt of any of the foregoing, and any combination of any of the foregoing. Preferably, the sorbitan fatty acid functionality is selected from the group consisting of sorbitan oleate, sorbiant laurate, sorbitan stearate, and sorbitan palmitate. Preferably, the sulfonate functionality is selected from the group consisting of hydroxyalkylsulfonates. More preferably, the alkyl group of the hydroxylalkylsulfonate functionality is selected from the group consisting of short-chain alkyl groups having in the range of 1 to 6 carbons. Preferably, an inorganic salt of the foregoing is selected from the group consisting of alkali metal, alkaline earth metal, and ammonium salts. Most preferably, the inorganic salt is an alkali metal salt.

Most preferably, the surfactant is selected from the group consisting of:

(a) Sorbitan oleate decylpolyglucoside;
(b) Sorbitan laurate decylpolyglucoside;
(c) Sorbitan stearate decylpolyglucoside;
(d) Sorbitan palmitate decylpolyglucoside;
(e) Decyl polyglucoside hydroxypropylsulfonate sodium salt;
(f) Lauryl polyglucoside hydroxypropylsulfonate sodium salt;
(g) Coco polyglucoside hydroxypropylsulfonate sodium salt;
(h) Lauryl polyglucoside sulfosuccinate disodium salt;
(i) Decyl polyglucoside sulfosuccinate disodium salt;
(j) Lauryl polyglucoside bis-hydroxyethylglycinate sodium salt;
(k) Coco polyglucoside bis-hydroxyethylglycinate sodium salt; and
(l) any combination of thereof.

In an embodiment, the APG derivative comprises a sorbitan oleate decylpolyglucoside.

In a spacer fluid, the APG derivative is preferably in a concentration in the range of 1% wt active/vol to 10% wt active/vol water.

These surfactants can be used for spacer fluids that are adapted for displacing an oil-based mud from a well. The surfactants are very effective for this purpose. In addition, the surfactants are compatible with tap water, seawater, and high concentrations of dissolved inorganic salt (e.g., 18% NaCl). The surfactants can be provided in an aqueous solution and can be diluted with water as may be desired or required under local operating regulations. More importantly, the surfactants are biodegradable and non-toxic.

Well Fluid Additives

A well fluid can contain additives that are commonly used in oil field applications, as known to those skilled in the art. These include, but are not necessarily limited to, brines, inorganic water-soluble salts, salt substitutes (such as trimethyl ammonium chloride), pH control additives, oxygen scavengers, alcohols, scale inhibitors, corrosion inhibitors, hydrate inhibitors, fluid-loss control additives, clay stabilizers, sulfide scavengers, fibers, nanoparticles, bactericides, and combinations thereof.

Of course, additives should be selected for not interfering with the purpose of the well fluid.

Method of Treating a Well with the Well Fluid

According to another embodiment of the invention, a method of treating a well, is provided, the method including the steps of: forming a treatment fluid according to the invention; and introducing the treatment fluid into the well.

A well fluid can be prepared at the job site, prepared at a plant or facility prior to use, or certain components of the well fluid can be pre-mixed prior to use and then transported to the job site. Certain components of the well fluid may be provided as a "dry mix" to be combined with fluid or other components prior to or during introducing the well fluid into the well.

In certain embodiments, the preparation of a well fluid can be done at the job site in a method characterized as being performed "on the fly." The term "on-the-fly" is used herein to include methods of combining two or more components wherein a flowing stream of one element is continuously introduced into flowing stream of another component so that the streams are combined and mixed while continuing to flow as a single stream as part of the on-going treatment. Such mixing can also be described as "real-time" mixing.

Often the step of delivering a well fluid into a well is within a relatively short period after forming the well fluid, e.g., less within 30 minutes to one hour. More preferably, the step of delivering the well fluid is immediately after the step of forming the well fluid, which is "on the fly."

It should be understood that the step of delivering a well fluid into a well can advantageously include the use of one or more fluid pumps.

Preferably, the step of introducing the well fluid (spacer fluid) is after a step of drilling the portion of the well with an oil-based mud.

Preferably, the step of introducing is at a rate and pressure below the fracture pressure of the treatment zone.

After the step of introducing a spacer fluid according to the invention, the method preferably includes the step of circulating the fluid in the well to wash out an oil-based mud.

After the step of introducing the spacer fluid, the method can include a step of cementing in the portion of the well.

Preferably, after any such well treatment, a step of producing hydrocarbon from the subterranean formation is the desirable objective.

EXAMPLES

To facilitate a better understanding of the present invention, the following examples of certain aspects of some embodiments are given. In no way should the following examples be read to limit, or define, the entire scope of the invention.

Materials

The performance of SODs was tested using a synthetic oil-based mud (OBM) obtained from a field operation. The major components include but are not necessarily limited to a synthetic base oil, water, barite, and a viscosifier. The same OBM composition of 10.7 ppg (1280 kg/m$^3$) was used in all testing.

The performance of the SODs was tested in comparison to conventional surfactants for use in spacer fluids, which are designated herein "AES," "DSS-A," and "DSS-B". These surfactants are known to provide good rheological compatibility between water and an OBM. However, such conventional surfactants are not biodegradable.

The AES is a water-soluble alkylether sulfate. AES acts to help with rheological compatibility between a spacer fluid and an oil-based mud. In addition, it acts as a degreaser, which helps promote cement bonding by displacing an oil-based mud and helping to remove oil from a metal surface of a tubular in a well. In some cases, the AES is the only surfactant required in a spacer fluid to wash away an OBM and achieve a water-wet condition. Of course, it can be combined with other surfactants. Testing including the AES is not included herein, however, the AES is known to be a useful surfactant in a spacer fluid.

The DSS-A and the DSS-B are of an ethoxylated nonylphenol. Ethoxylation is an industrial process in which ethylene oxide is added to alcohols and phenols to give surfactants. The ethoxylation process is attributed to Scholler and Wittwer at I. G. Farben industries. Carbon chain length is usually in the range of about 8 to 18 and the ethoxylated chain is usually 3 to 12 ethylene oxides, although longer ethoxylated chains are available. They feature both a lipophilic tails and a relatively polar head group $((OC_2H_4)_nOH)$. DSS-A has a shorter ethylene oxide chain length compared to DSS-B, which gives them differing in HLB values (Griffin scale). DSS-A is an oil-soluble surfactant. DSS-B is a water-soluble surfactant.

Weighting agents are commonly used in well fluids, including in spacer fluids. As used herein a weighting agent has an intrinsic density or specific gravity greater than 2.7. Preferably, the weighting agent has a specific gravity in the range of 2.7 to 8.0. Weighting agents are sometimes referred to herein as "high-gravity solids" or "HGS". Preferably, a weighting agent is insoluble in both a water phase and insoluble in an oil phase.

In some cases, a spacer fluid can include a particulate weighting agent. Any suitable particulate weighting agent can be employed according to the invention. For example, barite is a mineral consisting essentially of barium sulfate ($BaSO_4$). Barite is insoluble in water or oil and has a true density in the range of about 4.0 to 4.5 g/cm. It can be formed into a particulate useful as a weighting agent in drilling fluids or other well fluids. Other examples of weighting agents include, for example, particulate weighting material such as barite, hematite, iron oxide, manganese tetroxide, galena, magnetite, lilmenite, siderite, celesite, or any combination thereof. If included, the particulate weighting agent preferably has a particle size distribution anywhere in the range of 0.1 to 500 micrometers.

In some cases, a spacer fluid can include a particulate. For example, such a particulate can be a mixture of amorphous silica (60-100%) and crystalline silica (0-1%). In another example, such a particulate can be a mixture of crystalline silica 0-5% and bentonite (60-100%).

Wettability Testing Procedure

Wettability testing was done to test whether total phase inversion occurs upon mixing a spacer fluid and the OBM. An Apparent Wettability meter test (SSST) was used to measure Hogan readings, as described in "Water-Wetting Capability Testing" recently added to API Recommended Practice IOB-2/1 0 10426-2. The apparent-wettability apparatus measures both the surface-acting and electrical properties of the fluid being tested. The apparatus' circuitry and Eurotherm controller test the electrical activity in the fluid and on the electrode surfaces, and provide a continuous reading to reflect the apparent wettability of the fluid measured in the dimensionless unit of Hogans (Hn). The experimental procedure is summarized as follows:

1. The spacer fluid was conditioned to a test temperature for 30 minutes with constant high-shear stirring.
2. Wettability measurement equipment was calibrated using a spacer for 125 Hogan.
3. After calibration, the mixing jar was washed thoroughly with water.
4. Equal quantities of the OBM and the spacer fluid were added to the mixing jar.
5. The surfactant(s) to be tested were taken in syringes and slowly added into the fluid mixture until the meter reading showed 150 Hogan under the mixing conditions (300-600 rpm at the test temperature).
6. A fresh spacer fluid was prepared using the surfactants quantity as determined in step 5.
7. 200 ml of the OBM was added into the mixing jar. To this spacer fluid comprising the tested surfactant(s) was added and meter reading was monitored until it reaches 150 Hogans.

Compatibility Testing Procedure

Compatibility testing between the spacer fluid and the OBM was also performed. The experimental procedure is summarized as follows:

1. The spacer fluid
2. The OBM was conditioned at the test temperature for 30 minutes.
3. The spacer fluid and the OBM were mixed in various proportions.
4. Rheology was measured at the test temperature using a FANN™ Model 35 viscometer, as described above.

Wettability and Compatibility of a Spacer Fluid with SOD-2 (2.9% wt/vol) at 80° F.

In this example, DSS-B in a spacer fluid was replaced with SOD-2. The wettability and compatibility results are given below.

TABLE 1

Composition of Spacer Fluid - 12 ppg (1440 kg/m$^3$)

| Material | Amount |
|---|---|
| Water | 168.8 g |
| Mixture of amorphous silica and crystalline silica | 17.8 g |
| Barite | 100.9 g |
| DSS-A | 3 ml |
| SOD-2 | 7 ml (about 2.9% wt active/vol water) |

TABLE 2

Wettability Analysis

| Spacer (ml) | Hogans |
|---|---|
| 134 | 2 |
| 140 | 50 |
| 142 | 100 |
| 146 | 120 |
| 150 | 150 |

TABLE 3

Compatibility of Spacer Fluid with OBM at 80° F.

| Ratio Spacer Fluid:OBM (v:v) | Viscometer Readings | | | | | | | |
|---|---|---|---|---|---|---|---|---|
| | 3 | 6 | 30 | 60 | 100 | 200 | 300 | 600 |
| 100:00 | 11 | 14 | 20 | 25 | 26 | 35 | 43 | 64 |
| 90:10 | 15 | 18 | 25 | 29 | 32 | 41 | 49 | 66 |
| 75:25 | 16 | 19 | 26 | 31 | 34 | 42 | 46 | 66 |
| 50:50 | 14 | 16 | 21 | 26 | 29 | 38 | 44 | 67 |
| 25:75 | 11 | 15 | 29 | 42 | 60 | 110 | 124 | 242 |
| 10:90 | 13 | 16 | 26 | 39 | 52 | 86 | 118 | 196 |
| 00:100 | 13 | 16 | 25 | 38 | 48 | 76 | 99 | 157 |

Wettability and Compatibility of Spacer Fluid with SOD-2 (2.3% wt/vol) at 140° F.

In this example, the DSS-B in a spacer fluid was replaced with SOD-2, but at a lower concentration than in the above example and at 140° F. The wettability and compatibility results are given below.

TABLE 4

Composition of Spacer Fluid - 12 ppg (1440 kg/m$^3$)

| Material | Amount |
|---|---|
| Water | 168.8 g |
| Mixture of amorphous silica and crystalline silica | 17.8 g |
| Barite | 100.9 g |
| DSS-A | 3 ml |
| SOD-2 | 5.5 ml (about 2.3% wt active/vol water) |

TABLE 5

Wettability Analysis

| Spacer (ml) | Hogans |
|---|---|
| 200 | 20 |
| 210 | 50 |
| 215 | 75 |
| 220 | 150 |

TABLE 6

Compatibility of Spacer Fluid with OBM at 140° F.

| Ratio Spacer Fluid:OBM (v:v) | Viscometer Readings | | | | | | | |
|---|---|---|---|---|---|---|---|---|
| | 3 | 6 | 30 | 60 | 100 | 200 | 300 | 600 |
| 100:00 | 9 | 11 | 17 | 22 | 27 | 36 | 42 | 58 |
| 90:10 | 7 | 9 | 14 | 16 | 18 | 24 | 30 | 46 |
| 75:25 | 8 | 10 | 14 | 18 | 20 | 24 | 26 | 39 |
| 50:50 | 7 | 9 | 11 | 13 | 15 | 19 | 27 | 38 |
| 25:75 | 16 | 18 | 32 | 42 | 54 | 78 | 94 | 145 |
| 10:90 | 14 | 17 | 26 | 34 | 44 | 66 | 90 | 122 |
| 00:100 | 16 | 18 | 25 | 31 | 42 | 63 | 81 | 113 |

Wettability of Spacer Fluid Containing 18% Salt with SOD-2 at 80° F.

In this example, DSS-B in a spacer fluid containing 18% salt was replaced with SOD-2. The wettability results are given below.

TABLE 7

Composition of Spacer Fluid - 13.5 ppg (1,620 kg/m$^3$)

| Material | Amount |
|---|---|
| Water | 160 g |
| Crystalline silica 0-5%; Bentonite (60-100%) | 12.56 g |
| 36% NaCl solution | 171 ml |
| Barite | 270 g |
| DSS-A | 4 ml |
| SOD-2 | 6 ml (about 2.6% wt active/vol water) |

TABLE 8

Wettability Analysis

| Spacer (ml) | Hogans |
|---|---|
| 160 | 80 |
| 170 | 120 |
| 180 | 150 |

Wettability of Spacer Fluid Containing 18% Salt with SOD-1 and SOD-2 at 80° F.

In this example, DSS-A and DSS-B in a spacer fluid containing 18% salt were replaced with SOD-1 and SOD-2, respectively. The wettability and compatibility results are given below.

TABLE 9

Composition of Spacer Fluid - 13.5 ppg (1,620 kg/m$^3$)

| Material | Amount |
|---|---|
| Water | 160 g |
| Mixture of amorphous silica (60-100%) and Crystalline silica (0-1%) | 12.56 g |
| 36% NaCl solution | 171 ml |
| Barite | 270 g |
| SOD-1 | 6 ml |
| SOD-2 | 6 ml |

TABLE 10

Wettability Analysis

| Spacer (ml) | Hogans |
|---|---|
| 150 | 40 |
| 160 | 130 |
| 170 | 150 |

Results Discussion

The combination of two surfactants, DSS-A and SOD-2 performs well in a spacer fluid made from tab water as well as in a spacer fluid containing 18% NaCl salt. Such a material can replace a less environmentally friendly surfactant such as DSS-B.

In addition, DSS-A can be replaced with SOD-1.

The disclosed class of alkyl polyglycoside derivatives as surfactants (as exemplified by SOD-1 and SOD-2 above) are shown to be effective in a spacer fluid to achieve good compatibility with an oil-based drilling fluid at about room temperature (80° F.) as well as at a higher temperature of 140° F. It was observed that viscosities of the mixtures of such a spacer fluid and a typical oil-based mud were low (i.e., pumpable) and did not show gelation (abrupt increase in viscosity) at any particular proportions. It can be seen that, on addition of a spacer fluid with the surfactant gives a sharp increase in Hogan reading measured in an Apparent Wettability test. Thus, it can be concluded that this class of alkyl polyglycoside derivatives inverts an emulsion of an oil-based mud effectively without creating unstable emulsion phases (that is, without creating emulsion phases that readily separate into different fluid layers).

Further, this class of alkyl polyglycoside derivatives is effective in a spacer fluid without need of an AES surfactant to achieve the desired fluid compatibility with an oil-based mud.

In addition, class of alkyl polyglycoside derivatives is shown to be effective in spacer fluids containing high concentration of salts (e.g., 18% NaCl) without any incompatibility and still giving good wetting characteristics.

CONCLUSION

Therefore, the present invention is well adapted to attain the ends and advantages mentioned as well as those that are inherent therein.

The exemplary fluids disclosed herein may directly or indirectly affect one or more components or pieces of equipment associated with the preparation, delivery, recapture, recycling, reuse, or disposal of the disclosed fluids. For example, the disclosed fluids may directly or indirectly affect one or more mixers, related mixing equipment, mud pits, storage facilities or units, fluid separators, heat exchangers, sensors, gauges, pumps, compressors, and the like used generate, store, monitor, regulate, or recondition the exemplary fluids. The disclosed fluids may also directly or indirectly affect any transport or delivery equipment used to convey the fluids to a well site or downhole such as, for example, any transport vessels, conduits, pipelines, trucks, tubulars, or pipes used to fluidically move the fluids from one location to another, any pumps, compressors, or motors (e.g., topside or downhole) used to drive the fluids into motion, any valves or related joints used to regulate the pressure or flow rate of the fluids, and any sensors (i.e., pressure and temperature), gauges, or combinations thereof, and the like. The disclosed fluids may also directly or indirectly affect the various downhole equipment and tools that may come into contact with the chemicals/fluids such as, but not limited to, drill string, coiled tubing, drill pipe, drill collars, mud motors, downhole motors or pumps, floats, MWD/LWD tools and related telemetry equipment, drill bits (including roller cone, PDC, natural diamond, hole openers, reamers, and coring bits), sensors or distributed sensors, downhole heat exchangers, valves and corresponding actuation devices, tool seals, packers and other wellbore isolation devices or components, and the like.

The particular embodiments disclosed above are illustrative only, as the present invention may be modified and practiced in different but equivalent manners apparent to those skilled in the art having the benefit of the teachings herein. It is, therefore, evident that the particular illustrative embodiments disclosed above may be altered or modified and all such variations are considered within the scope and spirit of the present invention.

The various elements or steps according to the disclosed elements or steps can be combined advantageously or practiced together in various combinations or sub-combinations of elements or sequences of steps to increase the efficiency and benefits that can be obtained from the invention.

The invention illustratively disclosed herein suitably may be practiced in the absence of any element or step that is not specifically disclosed or claimed.

Furthermore, no limitations are intended to the details of construction, composition, design, or steps herein shown, other than as described in the claims.

What is claimed is:

1. A spacer fluid comprising:
   (a) water;
   (b) a solid particulate; and
   (c) an alkyl polyglycoside derivative, wherein the alkyl polyglycoside derivative is selected from the group consisting of: sorbitan laurate decylpolyglucoside, sorbitan stearate decylpolyglucoside, sorbitan palmitate decylpolyglucoside, and any combination thereof.

2. The spacer fluid according to claim 1, wherein the alkyl polyglycoside derivative is a derivative of an alkyl polyglucoside having a chemical structure:

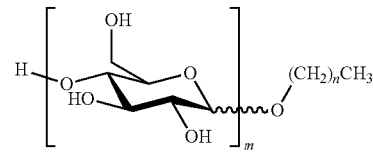

wherein n for the alkyl is 9; and
   wherein m for the polyglucoside is 2 or greater.

3. The spacer fluid according to claim 2, wherein m is in the range of 2 to 20.

4. The spacer fluid according to claim 1, wherein the solid particulate is or comprises a weighting agent.

5. The spacer fluid according to claim 4, wherein the weighting agent is selected from the group consisting of, barite, hematite, iron oxide, manganese tetroxide, galena, magnetite, lilmenite, siderite, celesite, and any combination thereof.

6. The spacer fluid according to claim 1, wherein the solid particulate is or comprises amorphous silica, crystalline silica, bentonite, and any combination thereof.

7. The spacer fluid according to claim 1, further comprising dissolved inorganic salt.

8. A spacer fluid comprising:
   (a) water;
   (b) a solid particulate; and
   (c) an alkyl polyglucoside derivative comprising alkyl groups, glucose units, and one or more sorbitan units, wherein the alkyl polyglycoside derivative is selected from the group consisting of: sorbitan laurate decylpolyglucoside, sorbitan stearate decylpolyglucoside, sorbitan palmitate decylpolyglucoside, and any combination thereof; wherein:
   (i) each of the alkyl groups has 8 to 24 carbons;
   (ii) the number of glucose units is in the range of 2 to 20; and
   (iii) the number of one or more sorbitan units is in the range of 1 to 10.

9. The spacer fluid according to claim 8, wherein the solid particulate is or comprises a weighting agent.

10. The spacer fluid according to claim 9, wherein the weighting agent is insoluble in both a water phase and in an oil phase.

11. The spacer fluid according to claim 9, wherein the weighting agent is selected from the group consisting of, barite, hematite, iron oxide, manganese tetroxide, galena, magnetite, lilmenite, siderite, celesite, and any combination thereof.

12. The spacer fluid according to claim 9, wherein the weighting agent has a particle size distribution anywhere in the range of 0.1 to 500 micrometers.

13. The spacer fluid according to claim 8, wherein the solid particulate is or comprises amorphous silica, crystalline silica, bentonite, and any combination thereof.

14. The spacer fluid according to claim 8, wherein a continuous phase of the spacer fluid comprises the water.

15. The spacer fluid according to claim 8, further comprising dissolved inorganic salt.

16. The spacer fluid according to claim 15, wherein the water is selected from the group consisting of tap water, seawater, and any combination thereof.

* * * * *